Figure 5:
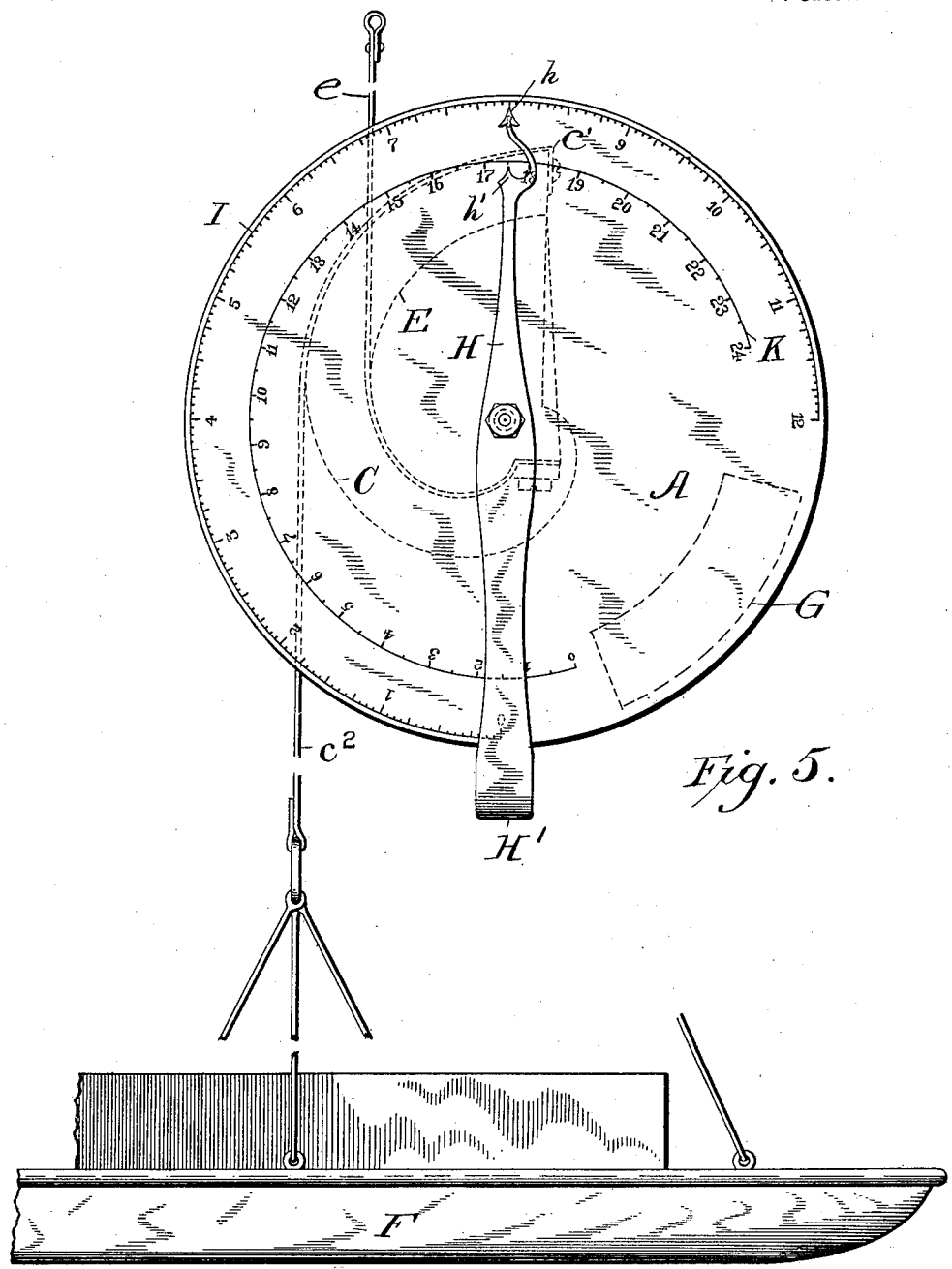

No. 653,256. Patented July 10, 1900.
C. H. MANN.
GRAVITY BALANCE.
(Application filed May 5, 1900.)
(No Model.) 4 Sheets—Sheet 1.
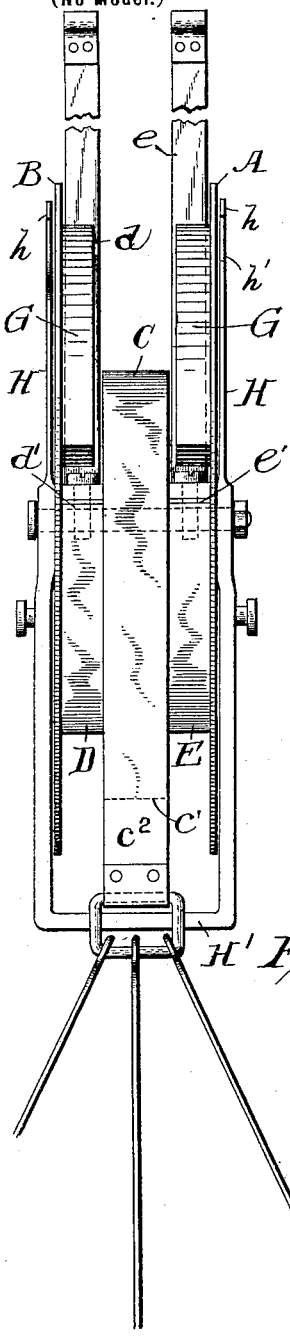
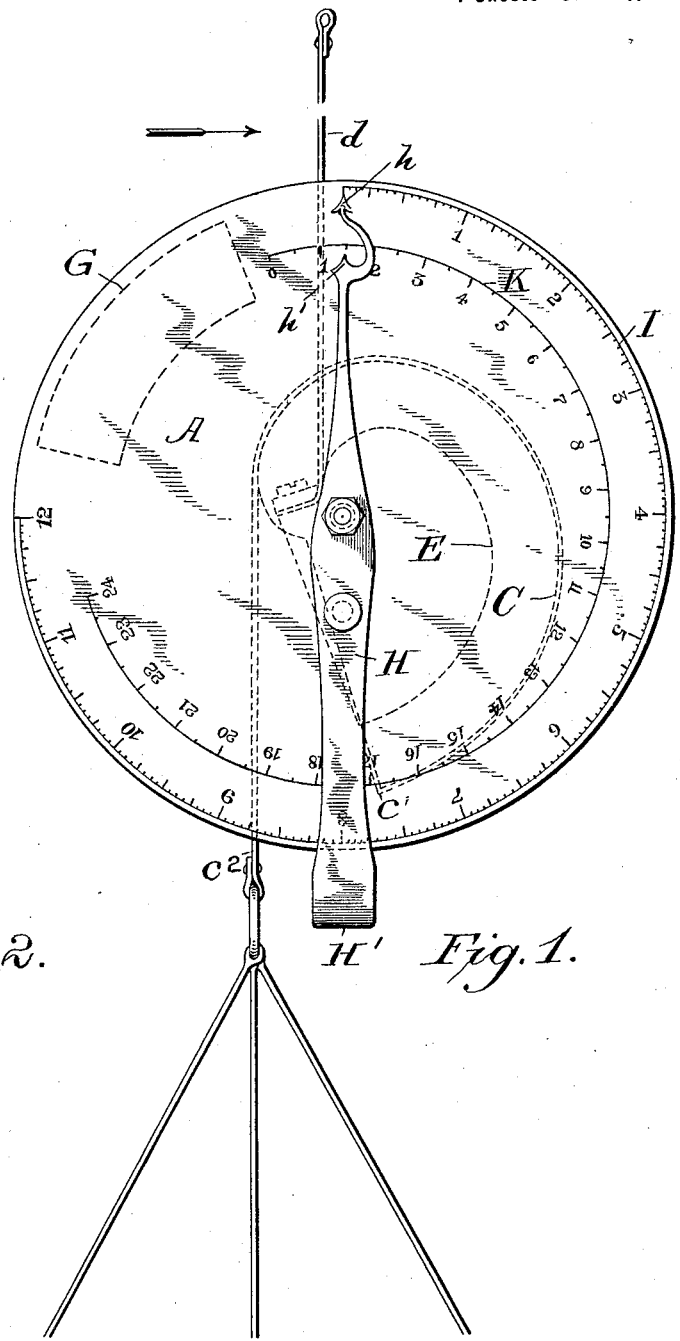
Witnesses:
J. B. McGirr.
A. M. Jones.
Inventor:
Charles H. Mann,
Per Edw. E. Lumly,
Atty.

No. 653,256. Patented July 10, 1900.
C. H. MANN.
GRAVITY BALANCE.
(Application filed May 5, 1900.)
(No Model.) 4 Sheets—Sheet 2.
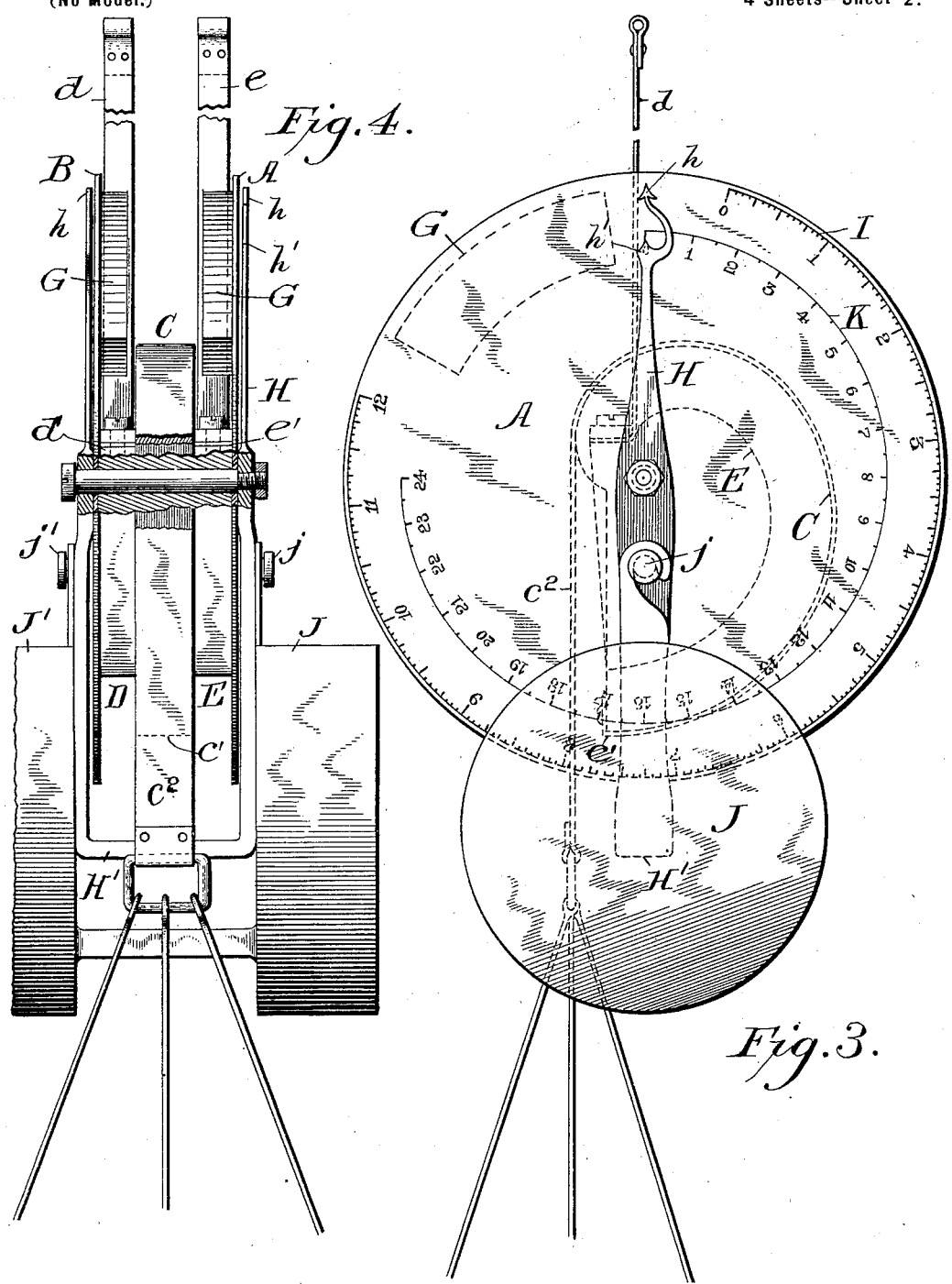
Witnesses:
Inventor.

No. 653,256. Patented July 10, 1900.
C. H. MANN.
GRAVITY BALANCE.
(Application filed May 5, 1900.)
(No Model.) 4 Sheets—Sheet 3.

Witnesses:
J. B. McGirr.
G. M. Jones.

Inventor:
Charles H. Mann,
Per Edw. E. Lumby,
Atty.

THE NORRIS PETERS CO., PHOTO-LITHO., WASHINGTON, D. C.

No. 653,256. Patented July 10, 1900.
C. H. MANN.
GRAVITY BALANCE.
(Application filed May 5, 1900.)
(No Model.) 4 Sheets—Sheet 4.

Witnesses:
J.B.McGirr.
A. M. Jones.

Inventor:
Charles H. Mann,
Per Eden E. Lumby,
Atty.

UNITED STATES PATENT OFFICE.

CHARLES H. MANN, OF ORANGE, NEW JERSEY.

GRAVITY-BALANCE.

SPECIFICATION forming part of Letters Patent No. 653,256, dated July 10, 1900.

Application filed May 5, 1900. Serial No. 15,596. (No model.)

*To all whom it may concern:*

Be it known that I, CHARLES H. MANN, of Orange, New Jersey, have invented a certain Improvement in Gravity-Balances, of which the following is a specification.

This improvement relates to a gravity-balance designed for the weighing purposes for which spring-balances have heretofore commonly been employed.

The invention consists of a weighing apparatus composed, essentially, of a system of suitably-differentiated paracentric cams, preferably three in number, arranged side by side, the two exterior cams being of like form and radial proportions and the middle cam of larger radial proportions, in combination with two flexible suspenders appropriately connected to and engaging the paracentric faces of the outer or smaller cams for suspending the apparatus from a stationary object and a flexible suspender connected to and engaging the paracentrically-curved face of the middle or larger cam for suspending from said apparatus the object which is to be weighed. The gravity of the object being weighed tends to unwind the weight-suspender from its cam and thus to impart a certain range of rotative motion to the weighing apparatus. During such motion the apparatus-suspenders are wound up upon the curved faces of their cams until by the resultant shifting of the center of gravity of the apparatus away from the vertical plane of the apparatus-suspenders the weight of the apparatus counterbalances the weight of the object which is being weighed. The cams may be arranged between and affixed to two disks having upon their faces concentrically-curved and suitably-graduated scales, or the disks may be dispensed with and the concentrically-curved scale or scales may be formed upon the outer face of one or both of the exterior cams. In either case an indicator-hand is loosely pivoted to the structure at the geometrical axis of each of the concentrically-curved scales whether the scales are formed upon the faces of the disks or upon the faces of the cams. The indicator-hands are weighted to retain them in vertical position, so that they serve to indicate the extent to which the apparatus has been rotated and the amount of the weight which has caused the rotation.

Figure 6:
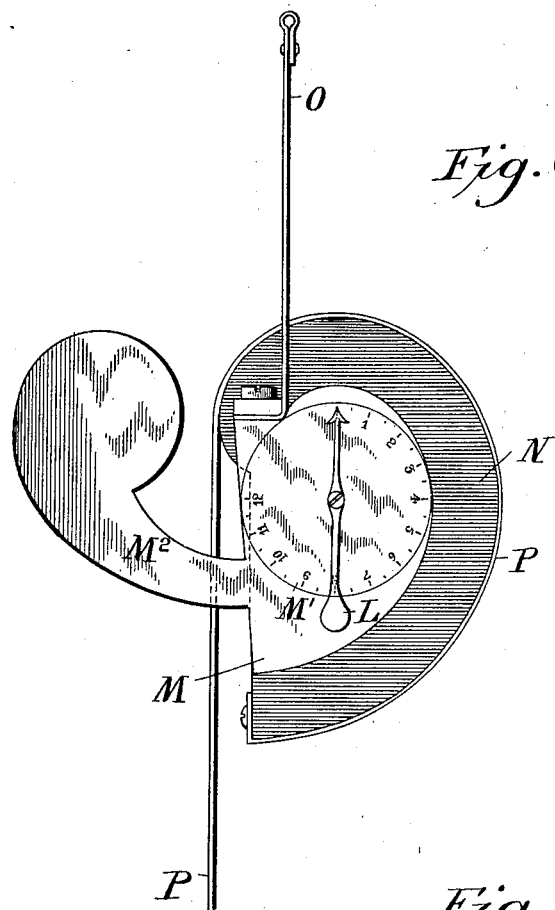
Figure 7:
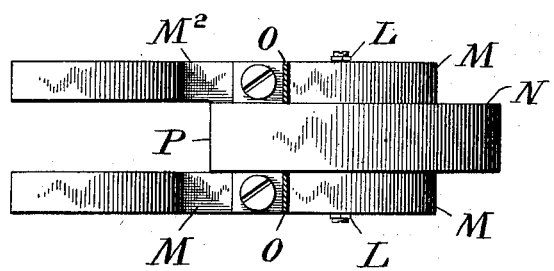

Certain features of the invention are more conveniently explained in connection with the subjoined detailed description of the two forms of illustrative apparatus shown in the accompanying drawings, which are as follows, viz:

Figure 1 is a face view of the preferred form of apparatus, showing the relative positions of the parts when the increasers are not employed and when there is no load in the pan, the paracentric cams being indicated in dotted lines. Fig. 2 is an edge view, partly in section, of the parts shown in Fig. 1. Figs. 3 and 4 are respectively face and edge views showing the increasers as applied and showing the positions of the parts with no load in the pan. Fig. 5 is a front elevation of the apparatus without the increasers, showing the load-suspender broken out and showing a portion of the pan with a load in it of, say, eight pounds and illustrating the rotative effect upon the apparatus of such a load, the paracentric cams and portions of the suspenders being represented in dotted lines. Figs. 6 and 7 are respectively a side view and top view showing the modification in which the disks are not employed, the scales being formed on the faces of the outer cams with suitably-proportioned weighted pointers loosely pivoted directly to the said cams.

The preferable form of apparatus consists of the two disks A and B, between which are rigidly fastened the three paracentric cams C, D, and E. Flexible suspenders $d$ and $e$ are appropriately fastened, respectively, to the heels $d'$ and $e'$ of the cams D and E and are intended for attachment to the stationary object from which the apparatus is to be suspended. The middle cam C has attached to its toe $c'$ one end of a flexible suspender $c^2$, which is laid around the curved face of the cam C and hangs downward therefrom and is designed to sustain the pan F or other device for holding objects to be weighed. The spiral faces of all the cams have the same pitch; but on any given radial plane the radius of the weight-suspender cam is to a prescribed extent greater than the radius of the apparatus-suspender cams, so that whatever may be the position of the cams within their available range of rotation of two hundred and seventy degrees the horizontal distance between the vertical plane of the apparatus-suspenders and the vertical plane of the weight-suspender is always the same. Of course the apparatus might be suspended by a single flexible suspender engaging an intermediate cam, with two outer cams engaging two flexible suspenders for sustaining the receptacle for the object to be weighed by appropriately changing the dimensions of the cams. It is preferred, however, to employ the intermediate cam as the weight-suspender, as shown in the drawings.

To establish the center of gravity at the center of the disks, each disk is loaded with a counterweight G to counterbalance the cams, the greater portions of the bodies of which are on one side of the center of the disks. If the weight of the apparatus be four pounds and the weight of the pan F be one pound, the apparatus will then arrange itself in the position shown in Fig. 1, in which the distance between the vertical plane of the center of gravity and the vertical plane of the apparatus-suspenders is one-fourth of the distance between the vertical plane of the apparatus-suspenders and the vertical plane of the weight-suspender. With the parts in this position the extreme point $h$ of the indicator-hand H will point to the zero-mark of the primary scale I. If an object weighing three pounds be now deposited in the pan F, the downward stress on the weight-suspender will cause the apparatus to rotate until the center of gravity has been so far shifted that the distance of its vertical plane from the vertical plane of the apparatus-suspenders will be the same as the distance between the vertical plane of the apparatus-suspenders and the vertical plane of the weight-suspender. The resultant rotation of the disk will bring the "3" mark of the primary scale immediately under the pointer $h$, and it will be found that the disk has rotated sixty-seven and one-half degrees. If four pounds more be placed in the pan F, the resultant further rotation of the disk will continue until the distance between the vertical plane of the center of gravity and the vertical plane of the apparatus-suspenders is twice as great as the distance between the vertical plane of the apparatus-suspenders and the vertical plane of the weight-suspender, and the disk will come to rest with the "7" mark of the primary scale immediately under the pointer $h$. The disk will then have rotated a further distance of ninety degrees. It will be seen that for each pound added to the pan F the disk rotates twenty-two and one-half degrees, and the primary scale I is graduated accordingly—that is, the pound-marks are twenty-two and one-half degrees apart. As a range of rotation of two hundred and seventy degrees is available for weighing purposes, the apparatus as shown in Fig. 1 is capable of weighing any part of twelve pounds. The apparatus can easily be so constructed as to weigh a larger amount. This can be effected in several ways, either by increasing the pitch of the paracentric cams, so as to make their throw greater for a given number of degrees of rotation, or the weight-suspender cam can be reduced in its dimensions. For example, by a reduction of one-half in the excess of radius of the weight-suspender cam over the radius of apparatus-suspender cam the distance between the vertical plane of the weight-suspender and the vertical plane of the apparatus-suspender would be reduced one-half, with the result that the leverage of the weight of the apparatus would be doubled, and hence the weighing capacity of the apparatus would be doubled. Without any change in the construction, however, the weighing capacity of the apparatus can easily be increased by adding weights to the disks, as illustrated in Fig. 3, which represents the added weights J J' as hung on the hooks $j j'$, projecting outwardly from the parts of the indicator-hands below the center of the disks. Preferably the indicator-hands are united beneath the disks by the cross-bar H'. Such added weights are herein for convenience designated "increasers." Assuming that they add four pounds in weight, the apparatus will then so arrange itself that the distance between the vertical plane of the center of gravity and the vertical plane of the apparatus-suspenders will be one-eighth of the distance between the vertical plane of the apparatus-suspenders and the vertical plane of the weight-suspender, as illustrated in Fig. 3, these proportionate distances corresponding to the proportions of the weights on the opposite sides of the plane of the apparatus-suspenders—to wit, eight pounds, the weight of the disks and increasers, and one pound, the weight of the pan F. By the resulting slight rotation of the disk the zero-mark of the primary scale is moved away from the pointer $h$. The disks are each therefore provided with a secondary scale K, the zero-mark of which when there is no load in the pan F stands immediately behind the secondary pointer $h'$, with which the indicator-hand is provided. When the weight of the disk is thus doubled, each added pound of load in the pan causes the disks to be rotated eleven and one-fourth degrees and the secondary scale K is graduated accordingly—that is, the pound-marks thereon are eleven and one-fourth degrees apart.

The invention is not limited to a weighing apparatus of the proportions indicated, and it is to be understood that the machine represented in the drawings is merely to be regarded as embodying an illustration of the invention, affording, in connection with the specification, adequate information for carrying the invention into effect generally either by the use of only one scale or by the use of a plurality of scales with correspondingly-proportioned increasers. In any case the apparatus-suspenders constitute a flexible fulcrum which remains in the same vertical plane, but which is shifted upwardly when the apparatus is rotated under the influence of a load deposited in the pan and shifted downwardly when the load is removed from the pan and the apparatus consequently rotates in the opposite direction. A further distinctive characteristic of the invention is that the apparatus itself constitutes the counterpoise for the load in the pan, for by the rolling action of its suspender-cams upon its flexible fulcrum it is made to automatically adjust itself with its center of gravity at such distance from the fulcrum as to counterbalance the weight of the pan and the load therein.

The broad invention may be carried into practice without the use of the described disks, as illustrated in Figs. 6 and 7, in which, as will be seen, the weighted pointers L L are pivoted to the exterior faces of the apparatus-suspender cams M M, on each of which the scales are formed concentrically with the axes of the weighted indicator-hands, one of said scales M' being shown in Fig. 6. In the modification thus represented the counterbalancing of the rotative structure is effected by means of arms $M^2$ $M^2$, projecting outwardly from the heels of the suspender-cams and so proportioned in weight as to counterbalance the structure and establish the center of gravity at a point coincident with the poles of the cams, this modification being herein shown for the purpose of illustrating the range of usefulness of the two-part system of differential paracentric cams M M and N, combined with the corresponding two-part system of suspenders O O and P.

It is to be understood that if increasers are to be employed it is highly desirable that the poles of the paracentric cams, the geometrical axes of the disks, and the line of the center of gravity of the rotating structure shall be coincident. Such coincidence, however, is not important if the increasers are not to be employed. When there is accurate coincidence between the poles of perfect paracentric cams and the line of the center of gravity, the scale-marks indicating similar increments of weight may be equidistant; but mathematical accuracy in the respect indicated may, within certain limits, be departed from by the adoption of the simple expedient of deferring the marking of the scale upon the disks until the apparatus is put together and then graduating the scale in conformity with the rotative effects produced upon the disks by the introduction into the pan of successive known increments of load, in each case placing upon the part of the face of the disk standing in radial alinement with the pointer the particular scale-mark corresponding with the load actually present in the pan.

In the foregoing description for the sake of clearness of illustration the pan or receptacle for the object to be weighed is assumed itself to have a weight of one pound. It may have a weight of either more or less than one pound, provided in any case the mark indicating zero of the scale is made on the part of the disk immediately adjacent the pointer when the apparatus is stationary in the position which it assumes when there is no load in the pan.

It will be perceived that in use as the load-suspender is unwound from its cam the portion of it which at first is on the counterpoise side of the vertical plane of the fulcrum is gradually transferred to the load side thereof, but that at the same time the apparatus-suspenders are wound up upon their cams, and thereby the weight of so much of them as is thus wound up is added to the counterpoise, so that to a close extent any disturbance of the center of gravity by the transfer to the load side of that part of the load-suspender which is unwound from the load-suspender cam is counterbalanced by winding up of a nearly-corresponding portion of the apparatus-suspenders upon their paracentric cams. The suspenders, however, are so light that any effect which they can have in shifting the center of gravity is so small as to be practically negligible; but any such effect, whether slight or otherwise, is completely compensated for when the expedient is adopted of putting the apparatus together and then placing the graduation-marks of the scale upon the disk in the manner described. It hence follows that a material part of the invention, which is equally present whether there is a mathematical coincidence between the poles of the paracentric cams and the line of the center of gravity of the apparatus or not, consists in the combination, with the rotatable structure composed, essentially, of the paracentric cams, the apparatus and load suspenders, and the weighted indicator-hands loosely pivoted to the rotative structure, of a scale the graduation-marks of which conform in respect of their relative positions to the limits of the different rotatable effects induced by different loads in the pan or other device for sustaining the objects to be weighed.

The herein-described gravity-balance is superior because it is a weighing instrument of precision which is not subject to deterioration in accuracy by use and because it is susceptible of being provided with a scale of such length as to permit of a considerable multiplicity of subdivisions, any one of which is readily distinguished when in radial alinement with the pointer.

What is claimed as the invention is—

1. A gravity-balance composed of a pair of disks provided with concentrically-arranged graduated scales and with weighted pointers loosely pivoted to their centers; a two-part system of differential paracentric cams affixed to and inclosed between said disks; a corresponding system of flexible suspenders appropriately connected to said cams for suspending said disks and the parts immediately connected therewith from a stationary object and for suspending from one part of said system of cams the load which is to be weighed.

2. In a gravity-balance substantially such as described, a two-part system composed of three paracentric cams arranged side by side, the exterior two of said cams constituting one part of said system and the inner cam constituting the other part of said system, the said parts having the same pitch but differing from each other in radius upon any given radial line to the same prescribed extent; a corresponding two-part system of flexible suspenders, one part of said system of suspenders connected at one end to the heel of the part of said system of cams having the smaller radius and connected at the opposite end to the stationary object from which the gravity-balance is suspended and constituting a flexible fulcrum, the other part of said system of flexible suspenders connected at one end to the toe of the part of said system of cams having the larger radius and adapted at the opposite end for connection with the load to be weighed.

3. In a gravity-balance substantially such as described, a pair of disks inclosing and affixed to a multiplicity of radially-differentiated paracentric cams arranged side by side and having a common pole in alinement with the geometrical axes of said disks, in combination with a two-part system of flexible suspenders appropriately attached to said cams for suspending said gravity-balance from a stationary object and for suspending from said gravity-balance the load to be weighed.

4. In a gravity-balance substantially such as described, a pair of disks, a multiplicity of radially-differentiated paracentric cams arranged side by side, affixed to and inclosed between said disks, counterbalancing-weights affixed to said disks in positions radially opposite the center of gravity of said cams, whereby the center of gravity of the rotating structure is made to coincide with the common pole of said paracentric cams and the geometrical axes of said disks.

5. In a gravity-balance substantially such as described, a pair of disks affixed to and inclosing suitably arranged and proportioned paracentric cams; two differently-figured scales arranged concentrically one within the other, on the face of each or both of said disks, a weighted hand loosely pivoted to the center of each of said disks and adapted to retain a vertical position, in combination with increasers adapted to be attached to said hands for the purpose of increasing the weighing capacity of said gravity-balance.

6. In a gravity-balance a self-adjusting rotatable counterpoise composed of a system of suitably-graduated disks and weighted pointers loosely pivoted to the center of said disks, and a two-part system of differential paracentric cams arranged side by side between and affixed to said disks, in combination with a flexible fulcrum composed of a suspending device appropriately attached to one-half of said system of paracentric cams and to the stationary object from which said gravity-balance is to be suspended, and a flexible suspender appropriately attached to the other part of said system of paracentric cams and adapted for connection with the load which is to be weighed, whereby the application of said load by causing the flexible load-suspender to unwind from the part of the paracentric-cam system with which it is connected induces a rotation of said disks and the winding up of said flexible fulcrum upon the other part of said system of paracentric cams until the center of gravity of the disks and parts immediately connected therewith is carried so far laterally from the vertical plane of the flexible fulcrum as to counterbalance the load which is to be weighed.

7. In a gravity-balance the combination as herein set forth of a rotatable structure containing the described paracentric cams; weighted hands loosely pivoted to said structure; flexible apparatus and load-suspenders, and a concentrically-arranged scale formed upon either face of said structure with its graduation-marks respectively conforming in their relative positions to the limits of the different ranges of rotation of said rotatable structure induced by different loads in the pan or other device for sustaining objects to be weighed.

8. In a rotative gravity-balance provided with a loosely-pivoted weighted pointer or pointers and with suitably-arranged scale-marks, a two-part system of differential paracentric cams arranged side by side and affixed to one another, in combination with a corresponding two-part system of flexible suspenders appropriately connected to said paracentric cams for suspending said apparatus from a stationary object and for suspending from said apparatus the load to be weighed.

CHARLES H. MANN.

Witnesses:
J. D. FLACK,
A. W. JONES.